(12) United States Patent
Nouri et al.

(10) Patent No.: US 10,272,817 B2
(45) Date of Patent: Apr. 30, 2019

(54) RETAINING BRACKETS FOR INTERIOR CONVENIENCE NETS AND OBJECTS

(71) Applicant: GM Global Technology Operations LLC, Detroit, MI (US)

(72) Inventors: Homan Nouri, Windsor (CA); Charles Calcaterra, Warren, MI (US); Michael W. Schroeder, Macomb, MI (US); Daniel Morales Lopez, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 15/371,310

(22) Filed: Dec. 7, 2016

(65) Prior Publication Data

US 2017/0240092 A1    Aug. 24, 2017

Related U.S. Application Data

(60) Provisional application No. 62/298,022, filed on Feb. 22, 2016.

(51) Int. Cl.
| | |
|---|---|
| *B60P 7/06* | (2006.01) |
| *B60P 7/08* | (2006.01) |
| *E06B 11/04* | (2006.01) |
| *F16B 45/00* | (2006.01) |
| *F16B 2/24* | (2006.01) |
| *E06B 9/00* | (2006.01) |
| *E06B 9/52* | (2006.01) |

(52) U.S. Cl.
CPC ............ *B60P 7/0807* (2013.01); *B60P 7/0876* (2013.01); *E06B 11/04* (2013.01); *F16B 2/245* (2013.01); *F16B 45/00* (2013.01); *E06B 9/521* (2013.01); *E06B 2009/002* (2013.01)

(58) Field of Classification Search
CPC ......... B60P 7/0807; B60P 7/04; B60P 7/0876; F16B 2/245
See application file for complete search history.

(56) References Cited

U.S. PATENT DOCUMENTS

| | | | | |
|---|---|---|---|---|
| 2,891,490 A * | 6/1959 | Elsner | ................... | B60P 7/0815 24/265 CD |
| 2,894,771 A * | 7/1959 | Putnam | ................... | F16B 2/245 403/230 |
| 3,601,349 A * | 8/1971 | Murphy | ................ | B60P 7/0815 410/104 |
| 5,139,375 A * | 8/1992 | Franchuk | .................. | B60P 7/04 224/321 |
| 5,180,263 A * | 1/1993 | Flowers, Jr. | .......... | B60P 7/0807 410/101 |
| 5,443,341 A * | 8/1995 | Hamilton | .............. | B60P 7/0807 24/68 CD |

(Continued)

*Primary Examiner* — Bradley Duckworth
(74) *Attorney, Agent, or Firm* — Lorenz & Kopf LLP

(57) ABSTRACT

A product for retaining objects that may include a base that may have a central body. A leg may extend from the central body. An anchor arm may extend from the leg. An offset portion may extend from the anchor arm. The leg, the anchor arm and the offset portion may define three sides of a receptacle. The receptacle may have a fourth side that may be open and that may face toward the central body. An anchor loop may extend from the central body. The anchor loop may have an anchor leg extending from the base, and may have a loop segment on the anchor leg.

13 Claims, 4 Drawing Sheets

(56) References Cited

U.S. PATENT DOCUMENTS

| | | | | |
|---|---|---|---|---|
| 6,039,520 | A * | 3/2000 | Cheng | B60P 7/0807 410/106 |
| 6,256,844 | B1 * | 7/2001 | Wheatley | B60P 7/0807 24/115 R |
| 6,273,654 | B1 * | 8/2001 | Whitaker | B60P 7/0807 410/101 |
| 6,350,089 | B1 * | 2/2002 | Tekavec | B60P 7/0807 410/101 |
| 6,618,912 | B1 * | 9/2003 | Chang | B60P 7/0807 24/265 CD |
| 6,935,819 | B2 * | 8/2005 | Squyres | B60P 7/0815 410/104 |
| 7,160,069 | B2 * | 1/2007 | Adams | B60P 7/0807 410/104 |
| 9,884,580 | B2 * | 2/2018 | Hemphill | B60P 7/0807 |
| 9,896,018 | B2 * | 2/2018 | Hemphill | B60P 7/0807 |
| 2010/0162538 | A1 * | 7/2010 | Neumann | B60P 7/0807 24/593.1 |
| 2016/0223171 | A1 * | 8/2016 | Gibbons | F21V 23/06 |
| 2017/0225605 | A1 * | 8/2017 | Sbongk | B60P 7/0807 |

\* cited by examiner

US 10,272,817 B2

RETAINING BRACKETS FOR INTERIOR CONVENIENCE NETS AND OBJECTS

CROSS-REFERENCE TO RELATED APPLICATIONS

This application claims the benefit of U.S. Provisional Application Ser. No. 62/298,022 filed Feb. 22, 2016.

TECHNICAL FIELD

The field to which the disclosure generally relates includes retention, and in particular includes retention of objects on a substantially fixed horizontal surface.

BACKGROUND

Securing objects in place may involve the use of an anchoring device that may function as a tie-down appliance. A common anchoring device involves a D-ring, which may be a fixed or pivoting D-shaped ring that can be attached to a surface to which objects such as cargo are desirably retained.

SUMMARY OF ILLUSTRATIVE VARIATIONS

A number of illustrative variations may involve a product for retaining objects that may include a base that may have a central body. A leg may extend from the central body. An anchor arm may extend from the leg. An offset portion may extend from the anchor arm. The leg, the anchor arm and the offset portion may define three sides of a receptacle. The receptacle may have a fourth side that may be open and that may face toward the central body. An anchor loop may extend from the central body. The anchor loop may have an anchor leg extending from the base, and may have a loop segment on the anchor leg.

A number of additional variations may involve a product for retaining objects and may include a base that may have a central body. A first leg may extend from the central body and a first anchor arm may extend from the first leg. A first offset portion may extend from the first anchor arm so that the first leg, the first anchor arm and the first offset portion may define three sides of a first receptacle. The first receptacle may have a first open side that may be open and that may face toward the central body. An anchor loop may extend from the central body. The anchor loop may have a first leg and may have a second leg extending from the base. A reverse loop segment may connect the first and second legs.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
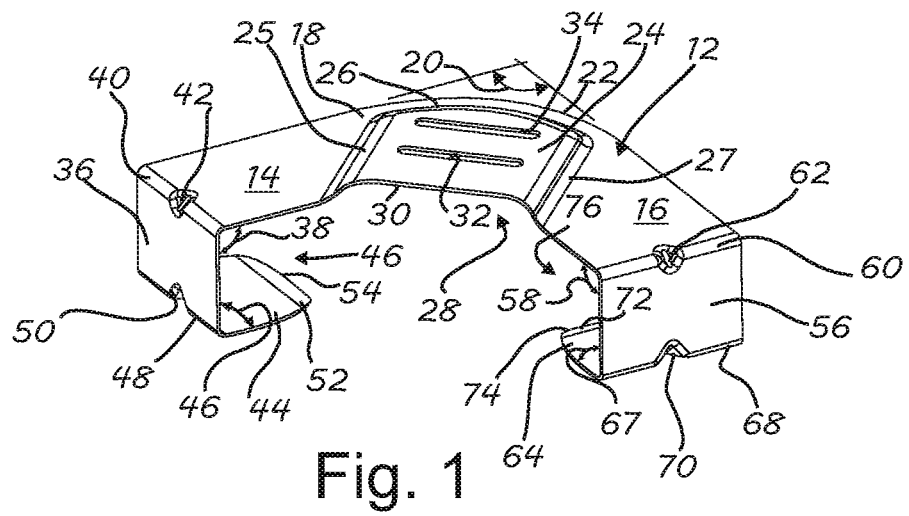
FIG. 1 is a perspective view of a product according to a number of variations.

According to a number of variations a product may include a base 12 as illustrated in FIG. 1. The base 12 may be manufactured from flat stock, or other stock, and may be shaped to the desired form, or may be produced from a moldable material in the desired shape, or by other means. The base 12 may be sufficiently rigid to be secured to a mounting surface and to serve as an anchor for objects such as cargo that may be carried on the surface. The base 12 may include a pair of legs 14 and 16 extending from a central body 18. The legs 14 and 16 may be disposed at an angle 20 that may be selected to match the surface to which the base 12 may be mounted, which in the current example may be ninety degrees. The central body 18 may have a rounded outer corner 22 so as to not create a catch point. A boss 24 may be formed in the shape of a louver and may be a raised portion of the central body 18. The louver shape of the boss 24 may result in three closed sides 25, 26 and 27 and an open side 28 that may coincide with an interior side portion 30 of the base 12 between the legs 14 and 16. One or more slots 32 and 34 may be formed through the boss 24 providing openings that may be linear, or another shape. The slots 32, 34 may have an elongated shape with widths that are small relative to their lengths. The slots 32 and 34 may be oriented so that their lengths extend in a direction from the side 25 to the side 27 and may be disposed substantially parallel to the interior side portion 30. The slots 32 and 34 may be spaced apart from one another on the boss 24.

In a number of variations, the base 12 may have an anchor arm 36 extending from the leg 14 and which may be at an angle 38 relative to the leg 14 through a bend 40. The angle 38 may be approximately ninety degrees and may be adjusted to suit the surface to which the base may be mounted. At least one gusset 42 may be formed in the bend 40 and may be approximately at the midpoint of the length of the bend 40, and may be in the shape of a dimple formed inward from the outside of the bend 40. The gusset 42 may stiffen or strengthen the bend 40 for desirable rigidity. An offset portion 44 may extend from the anchor arm 36 in a direction toward the central body 18 and may be disposed at an angle 46 relative to the anchor arm 36 through a bend 48. The angle 46 may be approximately ninety degrees and may be adjusted to suit the surface to which the base may be mounted. At least one gusset 50 may be formed in the bend 48, and may be approximately at the midpoint of the length of the bend 48, and may be in the shape of a dimple from the outside of the bend 48. The offset portion 44 may be offset from the leg 14 a distance equal to the length of the anchor arm 36, and may be disposed substantially parallel to the leg 14. A flange 52 in the shape of an outward turned edge 54 may be formed at the terminal edge of the offset portion 44 in the direction of the central body 18 to facilitate sliding of the base 12 onto a mating panel. The leg 14, the anchor arm 36 and the offset portion 44 may create a receptacle 46 for receiving a portion of the surface to which the base 12 may be mounted.

In a number of variations, the base 12 may have an anchor arm 56 extending from the leg 16 and which may be at an angle 58 relative to the leg 16 through a bend 60. The angle 58 may be approximately ninety degrees and may be adjusted to suit the surface to which the base may be mounted. At least one gusset 62 may be formed in the bend 60 and may be approximately at the midpoint of the length of the bend 60. An offset portion 64 may extend from the anchor arm 56 in a direction toward the central body 18 and may be disposed at an angle 67 relative to the anchor arm 56 through a bend 68. The angle 67 may be approximately ninety degrees and may be adjusted to suit the surface to which the base may be mounted. At least one gusset 70 may be formed in the bend 68 and may be approximately at the midpoint of the length of the bend 68. The offset portion 64 may be offset from the leg 16 a distance equal to the length of the anchor arm 56, and may be disposed substantially parallel to the leg 16. A flange 72 in the shape of an outward turned edge 74 may be formed at the terminal edge of the offset portion 64, extending in the direction of the central body 18 to facilitate sliding the base 12 onto a mating panel. The leg 16, the anchor arm 56 and the offset portion 64 may create a receptacle 76 for receiving a portion of the surface to which the base 12 may be mounted. The offset portions 44, 64 may be spring like, meaning that the flanges 52, 72 may be deflected away from the respective leg 14, 16 expanding the receptacles 46, 76 for receiving a mating panel. The offset portions 44, 64 may provide a clamping action to the panel due to the spring-like action. In additional variations, the offset portions 44, 64 may each include a set screw or other fastener that may be tightened against a mating panel in the receptacle 76. In additional variations, the anchor arms 36, 56 may each include an overlap portion that may be fixed with a fastener providing an adjustable length for receiving panels of various thickness in the receptacles 46, 76.

Figure 2:
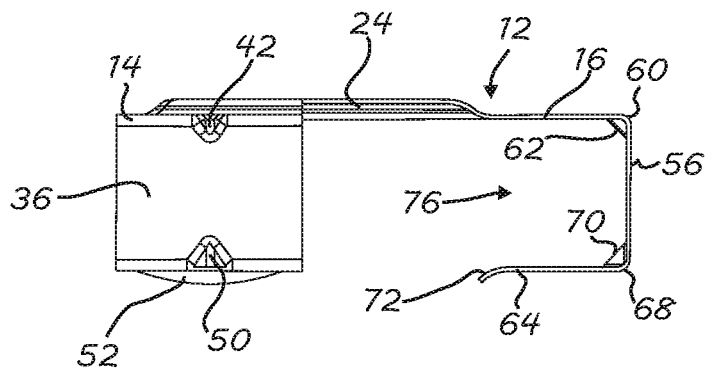
FIG. 2 is a side view of the product of FIG. 1 according to a number of variations.

In a number of variations as illustrated in FIG. 2, a view of the base 12 from a side perspective of the anchor arm 36 is shown. The gussets 42 and 50 are visible as V-shaped dimples formed into the base 12. The flange 52 is visible extending away from the leg 14. The boss 24 may be raised so that the slots 32 and 34 are elevated from the legs 14 and 16 providing clearance underneath the boss 24. The gussets 62 and 70 are visible as inward projections at the bends 60 and 68, respectively. The receptacle 76 may be a quadrilateral shaped area bounded on three sides by the leg 16, the anchor arm 56 and the offset portion 64. A fourth side of the receptacle 76 may be open for receiving purposes.

Figure 3:
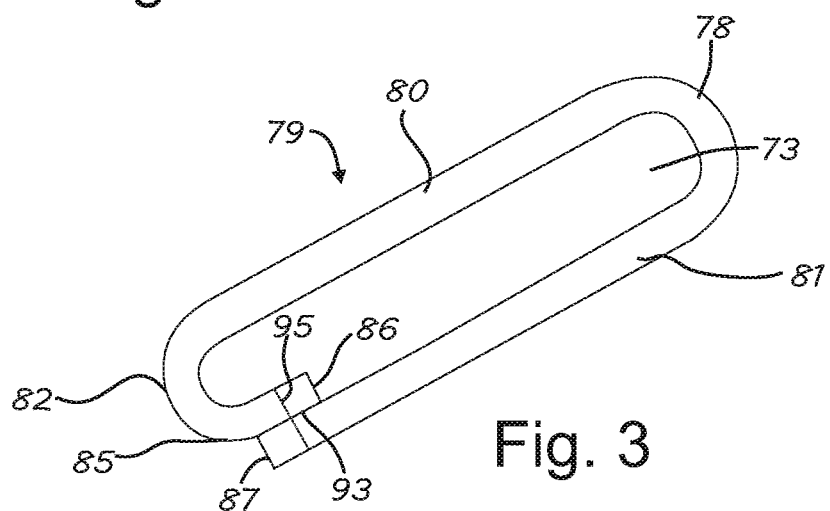
FIG. 3 is a side view of an anchor loop for use with the product of FIG. 1 according to a number of variations.
Figure 4:
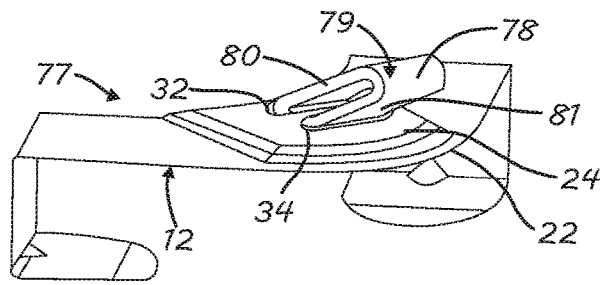
FIG. 4 is a perspective view of the product of FIG. 1 with the anchor loop of FIG. 3 according to a number of variations.

With reference to FIGS. 3 and 4, an anchor loop 79 for use with a product assembly 77 is illustrated according to a number of variations. The anchor loop 79 may be may be manufactured from a strip of flat material such as fabric, including seat belt type material, or from another type of stock, and may shaped to the desired form. In other variations, the anchor loop 79 may be produced from a moldable material in the desired shape, or by other means. The anchor loop 79 will be sufficiently strong to be secured to the base 12 as shown in FIG. 4. The anchor loop 79 may serve as an anchor for objects such as cargo that may be secured via the base 12 and the anchor loop 79. The anchor loop 79 may have a loop segment 78 shaped to receive a line, cable, hook, band, clasp, or other connection device, in the opening 73. The loop segment 78 may be U-shaped, with two anchor legs 80 and 81 extending from the loop segment 78. In other variations the legs may be formed in other shapes to fit the application. The anchor loop 79 may be inclined at an acute angle relative to the central portion 18 of the base 12 with the loop segment 78 extending over the rounded outer corner 22. The anchor loop 79 may include a reverse loop segment 82 that may be U-shaped and that may create an underlying segment 85 extending to a terminal end 86 that faces toward the loop segment 78. The underlying segment 85 lies on an opposite side of the base 12 from the loop segment 78 in the assembly of FIG. 4. The underlying segment 85 may be beneath or behind the central body 18. The anchor loop 79 may extend through the slots 32 and 34 securing the anchor loop 79 to the base 12. The anchor leg 81 may have a terminal end 87 facing away from the loop segment 78. The terminal ends 86 and 87 may be connected together. The reverse loop segment 82 may be reverse, in-that the underlying segment 85 extends back in a direction toward the loop segment 78. The terminal ends 86 and 87 may be inserted through the slots 32 and 34 in the base 12 with the underlying segment 85 disposed under the boss 24. The terminal ends 86 and 87 may be offset creating an overlap 93 through which the anchor loop 79 may be securely closed such as through stitching 95, or by another means which may include adhesive, fasteners, releasable hooks, or another joining method appropriate for the material used. The anchor loop 79 may thus be anchored to the base 12 in the product 77 with its closed loop structure securing the two together when loads may be applied to the loop segment 78 in three dimensions.

Figure 5:
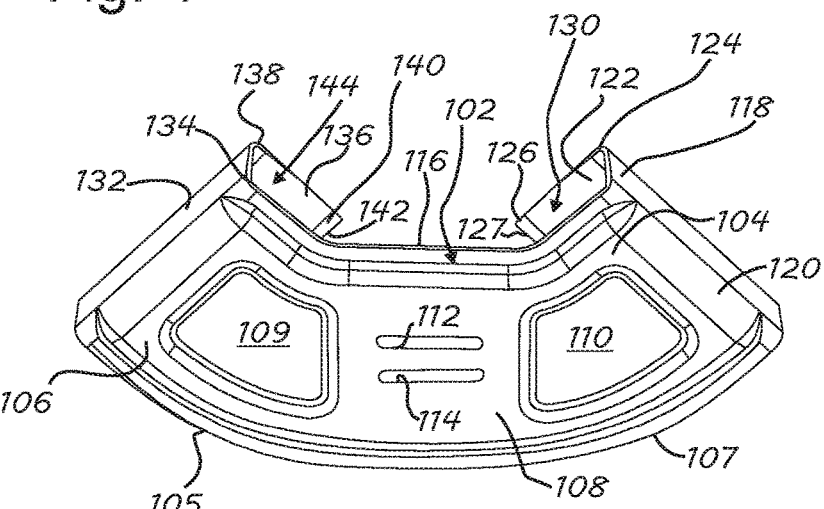
FIG. 5 is a perspective view of a product according to a number of variations.
Figure 6:
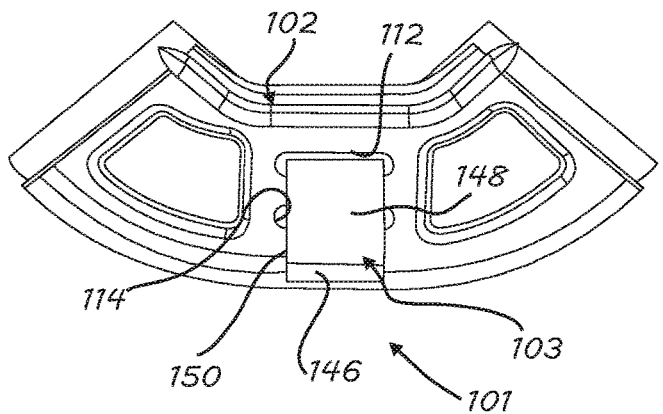
FIG. 6 is a perspective view of the product of FIG. 5 with an anchor loop, according to a number of variations.

In a number of variations as illustrated in FIGS. 5 and 6, a product may include a base 102 and an anchor loop 103. The base 102 may be manufactured from flat stock and shaped to the desired form, or may be produced from a moldable material in the desired shape, or by other means. The base 102 will be sufficiently rigid to be secured to a mounting surface and serve as an anchor for objects such as cargo that may be carried on the surface. The base 102 may include a pair of legs 104 and 106 extending from a central body 108. The legs 104 and 106 may be disposed at an angle that may be selected to match the surface to which the base 102 may be mounted and in the current example may be ninety degrees. The legs 104 and 106 may have curved or rounded outer edges 105 and 107. A boss 109 may be formed in the shape a depressed portion of the leg 106 and may enhance rigidity. Similarly, a boss 110 may be formed in the shape a depressed portion of the leg 104. The bosses 109 and 110 may be spaced away from all edges of the base 102 and may be formed in the shape of a rounded and curved trapezoid-like shape. One or more slots 112 and 114 may be formed through the central body 108 providing openings that may be linear. The slots 112 and 114 may have an elongated shape with widths that are small relative to their length. The slots 112 and 114 may be oriented so that their lengths extend in a direction from the boss 109 to the boss 110 and may be disposed substantially parallel to an interior edge 116 of the central body 108. The slots 112 and 114 may be spaced apart from one another on the central body, and may be centered between the bosses 109 and 110. The depressed bosses 109 and 110 may act to raise the slots 112, 114 off the surface of a panel to which the product 101 is mounted.

In a number of variations the base 102 may have an anchor arm 118 extending from the leg 104 and which may be disposed at an angle relative to the leg 104 through a bend 120. The angle may be approximately ninety degrees and may be adjusted to suit the surface to which the base may be mounted. An offset portion 122 may extend from the anchor arm 118 in a direction toward the central body 108 and may be disposed at an angle relative to the anchor arm 118 through a bend 124. The angle may be approximately ninety degrees and may be adjusted to suit the surface to which the base may be mounted. The offset portion 122 may be offset from the leg 104 a distance equal to the length of the anchor arm 118, and may be disposed substantially parallel to the leg 104. A flange 126 in the shape of an outward turned edge 127 may be formed at the terminal edge of the offset portion 122, extending in the direction of the central body 108. The leg 104, the anchor arm 118 and the offset portion 122 may create a receptacle 130 for receiving a portion of the panel to which the base 102 may be mounted.

In a number of variations the base 102 may have an anchor arm 132 extending from the leg 106 and which may be disposed at an angle relative to the leg 106 through a bend 134. The angle may be approximately ninety degrees and may be adjusted to suit the surface to which the base may be mounted. An offset portion 136 may extend from the anchor arm 132 in a direction toward the central body 108 and may be disposed at an angle relative to the anchor arm 132 through a bend 138. The angle may be approximately ninety degrees and may be adjusted to suit the panel to which the base may be mounted. The offset portion 136 may be offset from the leg 106 a distance equal to the length of the anchor arm 132, and may be disposed substantially parallel to the leg 106. A flange 140 in the shape of an outward turned edge 142 may be formed at the terminal edge of the offset portion 136, extending in the direction of the central body 108. The leg 106, the anchor arm 132 and the offset portion 136 may create a receptacle 144 for receiving a portion of the surface to which the base 102 may be mounted In a number of variations the anchor loop 103 may be manufactured from a strip of flat stock and may be shaped to the desired form, or may be produced from a moldable material in the desired shape, or by other means. The anchor loop 103 may be secured to the base 102 and may serve as an anchor for objects such as cargo that may be secured. The anchor loop 103 may have a loop segment 146 with two anchor legs 148 and 150 extending from the loop segment 78. Portions of the anchor legs 148 and 150 may be inserted through the slots 112 and 114 respectively, in the base 102, and may be secured therein by segments that extend through the slots 112, 114 and that hook around the portion of the base 102 between the slots 112, 114. The anchor loop 103 may thus be anchored to the base 102 in the product 101 securing the two together when loads may be applied to the loop segment 78 in three dimensions.

Figure 7:
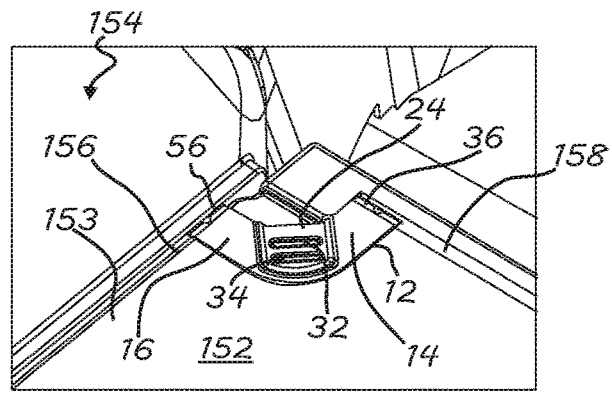
FIG. 7 is a perspective view of the product of FIG. 1, employed according to a number of variations.
Figure 8:
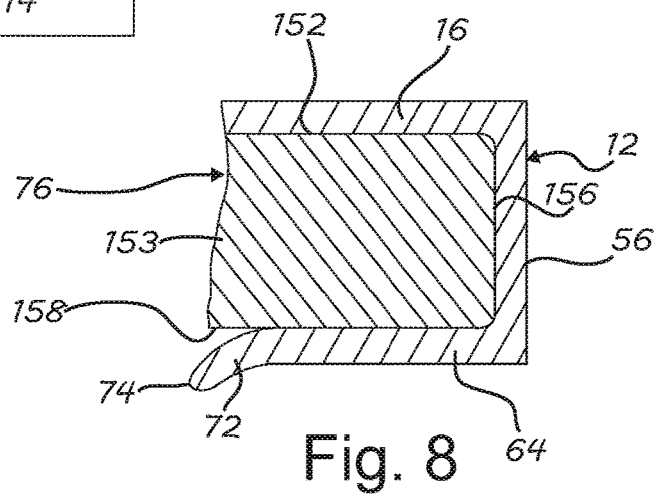
FIG. 8 is a fragmentary cross sectional illustration of a part of the product of FIG. 7 according to a number of variations.

In a number on variations as illustrated in FIGS. 7 and 8, the base 12 may be secured to a surface 152 of a panel 153, which may be in a part of a vehicle 154. The anchor arm 56 may secure the base 12 to an edge 156 of the panel 153 with the receptacle 76 receiving a portion of the panel 153 at the edge 156. The legs 14, 16 may be positioned against the surface 152 so that the boss 24 may be raised above the surface 152. The edge 156 may be positioned against the anchor arm 56. As shown in FIG. 8, a surface 158 of the panel 153 opposite the surface 152 may be positioned against the offset portion 64 with the flange 72 extending away from the surface 158 with the outward turned edge 74 spaced away from the surface 158. Similarly, the anchor leg 36 may be secured to another edge 158 of the panel 153. The base 12 may be removed from the panel 153 if desired when not needed. In a number of other variations, the base 12 may optionally be secured to the panel 153 by an adhesive, any number of fasteners, hooks, or through other fixing means. The anchor loop 79 may be removable from the base 12 as shown, if desired, such as through the use of a releasable fastener, and may be connected through the slots 32 and 34 as shown in FIG. 4, when desired. In a number of other variations, the anchor loop 79 may be permanently assembled to the base 12.

Figure 9:
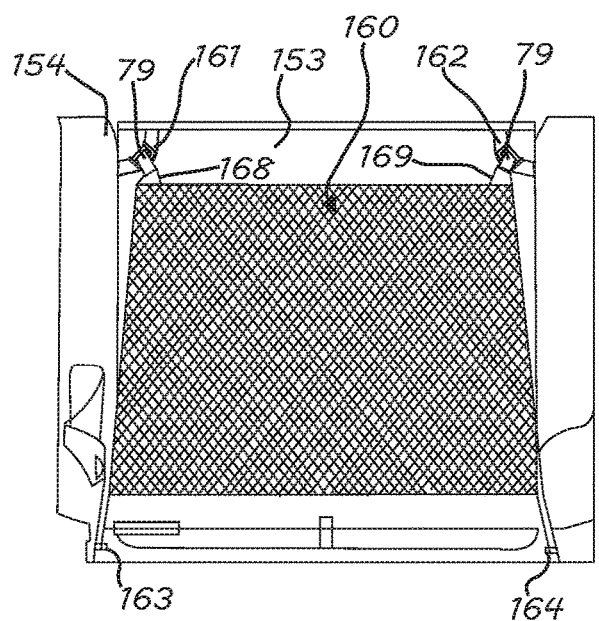
FIG. 9 is a perspective view of the product of FIG. 7 on a load floor area of a vehicle, employing the product of FIG. 4, according to a number of variations.

With reference to FIG. 9, the load floor area of the vehicle 154 is shown. A horizontally positioned convenience net 160 may be deployed over the panel 153, such as to secure cargo loaded on the load floor at or near the panel 153 against shifting during operation of the vehicle 154. The convenience net 160 may be secured between four anchor points 161-164. The rear anchor points 163 and 164 may be stud or D-ring type anchors, or another type of anchor that may be provided as original equipment in the vehicle 154. Optionally the product 77 or 101 may be used as at the anchor points 163 and 164. The forward anchor points 161 and 162 may be provided through the products 77 or 101, which may be provided as original equipment or aftermarket equipment. The convenience net 160 may include connection devices 168, 169 passing through the anchor loops 79, which may be bands, cables, lines or another extending device. In a number of other variations the products 77 or 101 may be used to secure lower vertical cargo nets at a lower anchor location than as may otherwise be available. In other variations the products 77 or 101 may be used as anchor points for a variety of purposes.

Figure 10:
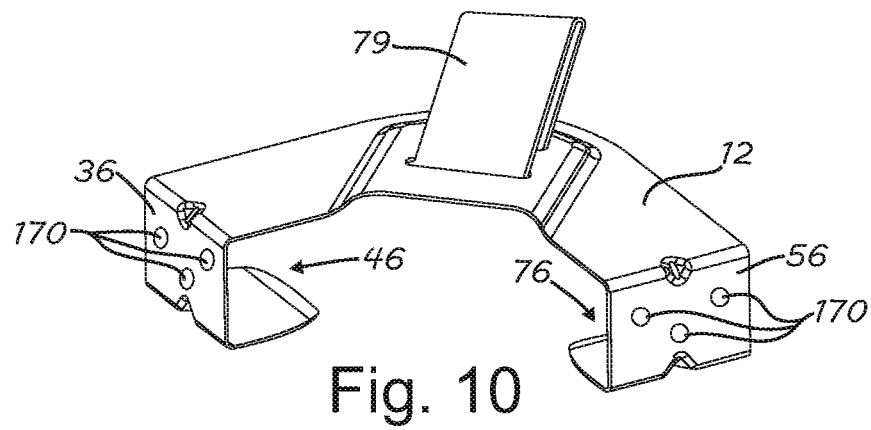
FIG. 10 is a perspective view of the product of FIG. 4 according to a number of variations.
Figure 11:
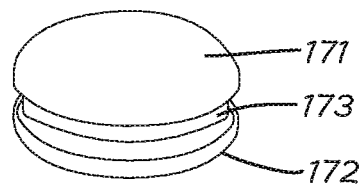
FIG. 11 is a perspective view of a part of the product of FIG. 10 according to a number of variations.
Figure 12:
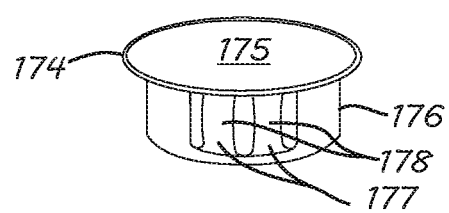
FIG. 12 is a perspective view of a part for use with the product of FIG. 11 according to a number of variations.
Figure 13:
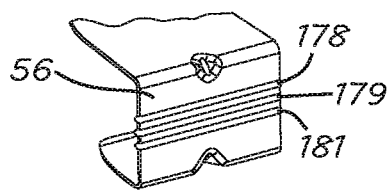
FIG. 13 is a fragmentary perspective view of a product according to a number of variations.
Figure 14:
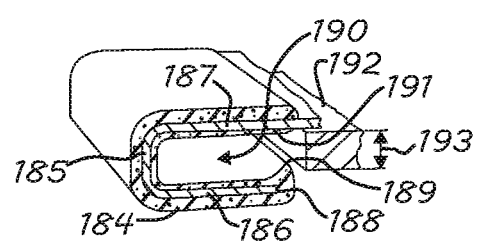
FIG. 14 is a fragmentary cross sectional illustration of a part of a product according to a number of variations.

In a number of variations as illustrated in FIG. 10 the base 12 may include a feature at the anchor arms 36 and 56 to inhibit squeak, rattle, vibration, or the like. A number of discrete resilient plugs 170 may be provided at spaced locations and may extend through holes in the anchor arms 36 and 56. The plugs 170 may be made of a rubber-like, or plastic material that exhibits resilient compressible properties. With reference to FIG. 11, the plugs 170 may include a pair of opposed heads 171 and 172 with rounded outer surfaces that may be disposed on opposite sides of the anchor legs 36, 56. The heads 171 and 172 may be joined by a cylindrical section 173 that may extend through the holes in the anchor arms 36, 56. The plugs 170 may contact the mating panel, such as the panel 153 of FIG. 8, to provide an energy absorbing interface. With reference to FIG. 12, in a number of other variations, the plugs 170 may include a head 174 with a raised surface 175. A cylindrical section 176 may extend from the head 174 opposite the raised surface 175. The cylindrical section 176 may include a number of flexible legs 177 that may have outward projecting centers 178 that may provide a secure connection in the holes of the anchor arms 36, 56. The cylindrical sections 176 may be inserted from the side of the receptacles 46 and 76 into the number of holes in the anchor arms 36, 56 so that the surface 175 faces inward. In a number of other variations as shown in FIG. 13, a set of bands 178, 179 and 181 may be disposed around the anchor legs such as the anchor leg 56. The bands 178, 179 and 181 may be made of a resilient rubber-like, or plastic material that may be energy absorbing. In a number of variations the bands 178-181 may be made of a squeak reduction type tape. In a number of variations as illustrated in FIG. 14, the area of the receptacles 46, 76 may be coated with a resilient rubber-like, or plastic material 184. The material 184 may coat the anchor arm 185, the offset portion 186, and/or the leg 187, or portions of any of the foregoing. The end 188 of the offset portion 186 may include a ridge 189 of the material 184 extending toward the leg 187. The receptacle 190 may be created by the anchor arm 185, the offset portion 186, and the leg 187 inside the coating material 184. The opening provided between the ridge 189 and the surface 191 may be smaller than the height dimension 193 of the panel 192 that may be received in the receptacle 190. As a result, the material 184 may deform, particularly at the ridge 189 when positioned onto the panel 192, which may provide enhanced grip.

Through the products 77 and 101 unique anchoring options may be provided. The components, elements, acts, product and methods as described herein may be combined and rearranged other than as expressly described herein and still are considered to be within the scope of the invention. For example only, the base 12 may have only one leg 14 or 16 and the base 102 may have only one leg 106 or 107. Also for example only, the anchor loop 79 may have only one leg, such as through integration of the anchor legs 80, 81. The following description of variants is only illustrative of components, elements, acts, product and methods considered to be within the scope of the invention and are not in any way intended to limit such scope by what is specifically disclosed or not expressly set forth.

Variation 1 may involve a product for retaining objects that may include a base that may have a central body. A leg may extend from the central body. An anchor arm may extending from the leg. An offset portion may extend from the anchor arm. The leg, the anchor arm and the offset portion may define three sides of a receptacle. The receptacle may have a fourth side that may be open and that may face toward the central body. An anchor loop may extend from the central body. The anchor loop may have an anchor leg extending from the base, and may have a loop segment on the anchor leg.

Variation 2 may include the product according to variation 1 wherein the central body may define a slot forming an opening through the base and wherein the anchor loop may be connected with the base in the slot.

Variation 3 may include the product according to variation 2 and may include a surface on which the base is mounted. The base may include a boss positioning the slot above the surface.

Variation 4 may include the product according to variation 3 wherein the anchor loop may include a reverse loop segment positioned through the slot.

Variation 5 may include the product according to variation 4 wherein an underlying segment may extend from the reverse loop segment on an opposite side of the central body from the loop segment.

Variation 6 may include the product according to variation 3 wherein a flange may extend from the offset portion to an edge that may be outward turned in a direction away from the leg.

Variation 7 may include the product according to variation 1 wherein the anchor loop may be inclined at an acute angle relative to the central body.

Variation 8 may include the product according to variation 1 wherein a bend may be formed between the leg and the anchor arm. A gusset may be located in the bend.

Variation 9 may include the product according to variation 1 and may include a panel received in the receptacle.

Variation 10 may include the product according to variation 1 and may include a surface on which the base is mounted. The central body may define a slot forming an opening through the base. The anchor loop may be connected with the base in the slot. The base may include a boss positioning the slot above the surface. The boss may be formed in the shape of a louver with three closed sides and an open side.

Variation 11 may involve a product for retaining objects and may include a base that may have a central body. A first leg may extend from the central body and a first anchor arm may extend from the first leg. A first offset portion may extend from the first anchor arm so that the first leg, the first anchor arm and the first offset portion may define three sides of a first receptacle. The first receptacle may have a first open side that may be open and that may face toward the central body. An anchor loop may extend from the central body. The anchor loop may have a first leg and may have a second leg extending from the base. A reverse loop segment may connect the first and second legs.

Variation 12 may include the product according to variation 11 and may include a second leg that may extend from the central body. A second anchor arm may extend from the second leg, and a second offset portion may extend from the second anchor arm. The second leg, the second anchor arm and the second offset portion may define three sides of a second receptacle. The second receptacle may have a second open side that may be open and that may face toward the central body.

Variation 13 may include the product according to variation 12 wherein a resilient projection may be provided on each of the first and second legs extending into the first and second receptacles.

Variation 14 may include the product according to variation 12 and may include a panel positioned in the first and second receptacles. The panel may extend through the first and second open sides.

Variation 15 may include the product according to variation 14 wherein the base may define at least one slot. The anchor loop may extend through the at least one slot.

Variation 16 may include the product according to variation 15 wherein the anchor loop may include a reverse loop segment that may be positioned through the at least one slot.

Variation 17 may include the product according to variation 16 wherein an underlying segment may extend from the reverse loop segment on an opposite side of the central body from the loop segment.

Variation 18 may include the product according to variation 15 wherein the panel may include a surface that may be positioned against the first and second legs. The base may have a boss positioning the slot away from the surface. The underlying segment may be positioned between the surface and the base at the boss.

Variation 19 may include the product according to variation 12 and may include a net having a connection device passing through the loop segment.

Variation 20 may include the product according to variation 19 wherein the net may be stretched horizontally between four anchor points.

The above description of select variations within the scope of the invention is merely illustrative in nature and, thus, variations or variants thereof are not to be regarded as a departure from the spirit and scope of the invention.

What is claimed is:

1. A product comprising:
a base having a central body with a leg extending from the central body, and an anchor arm extending from the leg, wherein the anchor arm extends at an angle relative to the leg through a bend;
at least one gusset formed in the bend of the anchor arm located approximately at a midpoint of a length of the bend of the anchor arm, wherein the at least one gusset having a shape of a dimple formed inward from outside of the bend wherein the at least one gusset is configured to stiffen or to strengthen the bend for rigidity;
an offset portion which extends from the anchor arm wherein the offset portion is spaced from the leg by a distance approximately equal to a length of the anchor arm, and is disposed substantially parallel to the leg;
a flange of a shape of an outward turned edge formed at a terminal edge of the offset portion and extending to the central body of the base to facilitate sliding the base onto a mating panel;
a receptacle configured in a quadrilateral shape having a first, a second, and a third side comprising: the leg, the anchor arm and the offset portion and a fourth side that is open and that faces toward the central body;
an anchor loop extending to a central body of the receptacle, the anchor loop having an anchor leg extending from the base;
a loop segment of the anchor leg configured in an incline at an acute angle relative to the central body of the base; with the loop segment extending over a rounded outer corner of the base;
an U-shaped reverse loop segment to create an underlying segment extending to a terminal end of the loop segment and which faces toward the loop segment wherein the underlying segment lies on an opposite side of the base from the loop segment;
the underlying segment beneath or behind the central body wherein the anchor loop extends through a set of slots in the base wherein the set of slots are spaced apart on a boss and positioned to secure the anchor loop to the base; and
a first and second terminal end of the anchor loop wherein a first terminal end faces away from the loop segment to enable both the first and second terminal ends to be connected together,
wherein the first and second terminal ends can be inserted through the set of slots in the base with the underlying segment disposed under the boss; wherein the first and second terminal ends are offset to create an overlap through which the anchor loop can be securely closed for the anchor loop to be anchored to the base in a closed loop structure securing the base to the anchor loop to enable loads to be applied to the loop segment in three dimensions.

2. The product according to claim 1, further comprising: the mating panel received in the receptacle.

3. The product according to claim 1, further comprising: the mating panel, the mating panel having a surface on which the base is mounted, wherein the central body defines the set of slots wherein each slot forms an opening through the base, and the anchor loop is connected to the base by at least one of the slots of the set of slots, wherein the base includes the at least one of the slots positioned above the surface by the boss, wherein the boss is formed in the shape of a louver with three closed sides and an open side.

4. The product according to claim 1, further comprising: a resilient projection on the leg extending into the receptacles.

5. The product according to claim 1, wherein the mating panel is positioned in the receptacles and extending through the open sides.

6. The product according to claim 5, wherein the mating panel includes a surface positioned against the leg and wherein the base has the boss positioning the slot away from the surface so that the underlying segment is positioned between the surface and the base at the boss.

7. A product comprising:
a base having a central body with a leg extending from the central body, and an anchor arm extending from the leg, wherein the anchor arm extends at an angle relative to the leg through a bend;
at least one gusset formed in the bend of the anchor arm located approximately at a midpoint of a length of the bend of the anchor arm, wherein the at least one gusset having a shape of a dimple formed inward from outside of the bend wherein the at least one gusset is configured to stiffen or to strengthen the bend for rigidity;
an offset portion which extends from the anchor arm wherein the offset portion is spaced from the leg by a distance approximately equal to a length of the anchor arm, and is disposed substantially parallel to the leg;
a flange of a shape of an outward turned edge formed at a terminal edge of the offset portion and extending to the central body of the base to facilitate sliding the base onto a mating panel;
a receptacle configured in a quadrilateral shape having a first, a second, and a third side comprising: the leg, the anchor arm and the offset portion and a fourth side that is open and that faces toward the central body with the mating panel received in the receptacle;
an anchor loop extending to a central body of the receptacle, the anchor loop having an anchor leg extending from the base;
a loop segment of the anchor leg configured in an incline at an acute angle relative to the central body of the base; with the loop segment extending over a rounded outer corner of the base;
an U-shaped reverse loop segment to create an underlying segment extending to a terminal end of the loop segment and which faces toward the loop segment wherein the underlying segment lies on an opposite side of the base from the loop segment;
the underlying segment beneath or behind the central body wherein the anchor loop extends through a set of slots in the base wherein the set of slots are spaced apart on a boss and positioned to secure the anchor loop to the base; and
a first and second terminal end of the anchor loop wherein a first terminal end faces away from the loop segment to enable both the first and second terminal ends to be connected together,
wherein the first and second terminal ends can be inserted through the set of slots in the base with the underlying segment disposed under the boss; wherein the first and second terminal ends are offset to create an overlap through which the anchor loop can be securely closed for the anchor loop to be anchored to the base in a closed loop structure securing the base to the anchor loop to enable loads to be applied to the loop segment in three dimensions.

8. The product according to claim 7, further comprising: the mating panel, the mating panel having a surface on which the base is mounted, wherein the central body defines the set of slots wherein each slot forms an opening through the base, and the anchor loop is connected to the base by at least one of the slots of the set of slots, wherein the base includes the at least one of the slots positioned above the surface by the boss, wherein the boss is formed in the shape of a louver with three closed sides and an open side.

9. The product according to claim 8, further comprising: a resilient projection on the leg extending into the receptacle.

10. The product according to claim 9, further comprising: the mating panel is positioned in the receptacle and extending through the open side.

11. The product according to claim 10, wherein the mating panel includes: a surface positioned against the leg and wherein the base has the boss positioning the slot away from the surface so that the underlying segment is positioned between the surface and the base at the boss.

12. The product according to claim 11 further comprising: a net having a connection device passing through the loop segment.

13. A product comprising:
a base having a central body with a leg extending from the central body, and an anchor arm extending from the leg, wherein the anchor arm extends at an angle relative to the leg through a bend;
at least one gusset formed in the bend of the anchor arm located approximately at a midpoint of a length of the bend of the anchor arm, wherein the at least one gusset having a shape of a dimple formed inward from outside of the bend wherein the at least one gusset is configured to stiffen or to strengthen the bend for rigidity;
an offset portion which extends from the anchor arm wherein the offset portion is spaced from the leg by a distance approximately equal to a length of the anchor arm, and is disposed substantially parallel to the leg;
a flange of a shape of an outward turned edge formed at a terminal edge of the offset portion and extending to the central body of the base to facilitate sliding the base onto a mating panel;
a receptacle configured in a quadrilateral shape having a first, a second, and a third side comprising: the leg, the anchor arm and the offset portion and a fourth side that is open and that faces toward the central body with the mating panel received in the receptacle;
an anchor loop extending to a central body of the receptacle, the anchor loop having an anchor leg extending from the base;
a loop segment of the anchor leg configured in an incline at an acute angle relative to the central body of the base; with the loop segment extending over a rounded outer corner of the base;
an U-shaped reverse loop segment to create an underlying segment extending to a terminal end of the loop segment and which faces toward the loop segment wherein the underlying segment lies on an opposite side of the base from the loop segment;
the underlying segment beneath or behind the central body wherein the anchor loop extends through a set of slots in the base wherein the set of slots are spaced apart on a boss and positioned to secure the anchor loop to the base;
the mating panel having a surface on which the base is mounted, wherein the central body defines the set of slots wherein each slot forms an opening through the base, and the anchor loop is connected to the base by at least one of the slots of the set of slots, wherein the base includes that at least one of the slots positioned above the surface by the boss, wherein the boss is formed in the shape of a louver with three closed sides and an open side; and
a first and second terminal end of the anchor loop wherein a first terminal end faces away from the loop segment to enable both the first and second terminal ends to be connected together,
wherein the first and second terminal ends can be inserted through the set of slots in the base with the underlying segment disposed under the boss; wherein the first and second terminal ends are offset to create an overlap through which the anchor loop can be securely closed for the anchor loop to be anchored to the base in a closed loop structure securing the base to the anchor loop to enable loads to be applied to the loop segment in three dimensions.

* * * * *